L. S. BRACH.
LOCK NUT.
APPLICATION FILED APR. 6, 1910.

1,021,235.

Patented Mar. 26, 1912.

UNITED STATES PATENT OFFICE.

LEON S. BRACH, OF NEW YORK, N. Y.

LOCK-NUT.

1,021,235.  Specification of Letters Patent.  Patented Mar. 26, 1912.

Application filed April 6, 1910. Serial No. 553,804.

*To all whom it may concern:*

Be it known that I, LEON ST. CLAIR BRACH, residing at New York, in the county of New York and State of New York, have invented certain new and useful Improvements in Lock-Nuts, of which the following is a specification.

This invention relates to the type of nut locks in which a movable locking member, preferably carried by the nut and unaided by an auxiliary device, is made to prevent the nut from unscrewing on its bolt, by biting into the bolt whenever there is any tendency to unscrew or turn back the nut, while it allows the nut to be turned in the other direction freely, for the purpose of screwing it up.

One object of the invention is to provide, in a device of the kind described, a locking member interposed between the bolt and the nut and carried by one of them, said locking member having a portion adapted for rolling engagement with one of said members, and for gripping engagement with the other, there being at all times a stress between the bolt, locking member, and nut.

Another object is to provide a locking member as aforesaid, which is oscillatory with respect to the nut and bolt, and whose center of oscillation tends to approach that of the nut when the latter is rotated in one direction, and to recede therefrom when it is rotated in the other direction.

A further object is to provide a device of the kind described in which the fit of the nut upon the bolt is slightly loose, while the gripping portion of the locking member extends at all times beyond the periphery of the piece which carries the locking member, so that the nut is slightly eccentric upon the bolt.

Still another object is to provide a device of the kind described, in which the rolling movement of the locking member in one direction is limited to a point at which its center of oscillation is farthest from that of the center of the bolt, the relation of parts being such that when the locking member is in this position the gripping portion will have a positive contact relation to the member which it engages, but not a gripping relation, the latter being brought about as soon as the locking member is moved to change its center of oscillation to a point nearer that of the nut.

Other objects and aims of the invention, more or less broad than those stated above, will be in part obvious and in part referred to in the course of the following description of the elements, combinations, arrangement of parts and applications of principles constituting the invention; and the scope of protection contemplated will be indicated in the claims.

Figure 1:
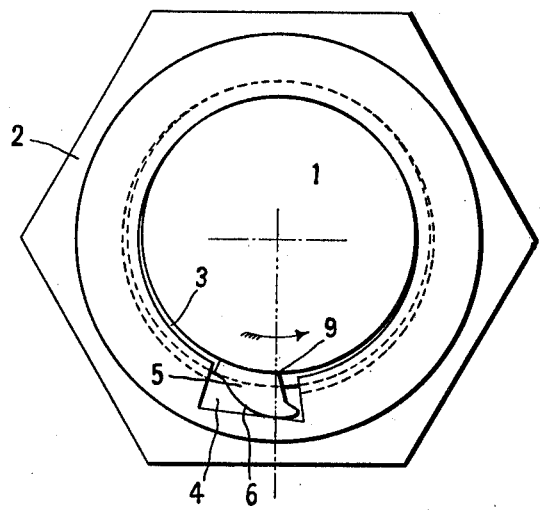
Figure 2:
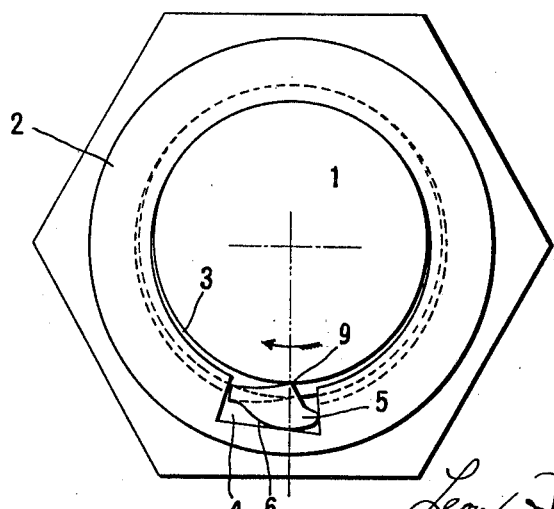

In the accompanying drawings, which are to be taken as a part of this specification, and in which I have shown a merely preferred form of embodiment of the invention: Figure 1 is a face view of a nut provided with a locking member and exemplifying my present invention, illustrating the normal relation of the parts when the bolt is rotated with respect to the nut in the direction of the arrow, which in the form shown would be the direction to screw the nut down upon the bolt. Fig. 2 is a similar view, showing the parts in the position they occupy when the bolt is rotated in the reverse direction.

Referring to the numerals on the drawings, 1 indicates a screw bolt or its equivalent, and 2 a nut, having the usual threaded aperture 3 for the bolt. 4 indicates a gap or slot in the inner wall of the nut, preferably extending longitudinally thereof, and throughout its entire extent. The mouth of the recess 4 is on an arc corresponding to that of the nut threads; and for reasons hereinafter explained, it is preferred that the bottom wall of the slot shall be straight, but at an angle to the chord of the edges of the recess, as shown.

Considering now the locking member proper, the same is preferably of harder material than that of the member (in this case the bolt) with which it is adapted to have gripping engagement, and is provided with a face 6, whereby it may have rolling engagement with the bottom wall of the slot 4. Where the bottom wall is straight, as shown in the drawings, the contacting face of the locking member should be curved, somewhat as shown. But it is obvious that the bottom wall of the slot may be curved and the contacting face of the locking member straight; or the said contacting surfaces may be reversely curved or even similarly curved, provided the curves are of different degree, so that the locking member may have such rolling engagement with a wall, preferably the bottom wall, of the recess that as soon as the nut is rotated in one direction said locking member will bite into the bolt.

The locking member is provided with another face, adapted to engage with the threaded bolt, and this portion of the locking member is threaded to correspond to the threading of the nut, the edge 9 thereof biting into the bolt when the locking member is rolled to the position of Fig. 2, it being understood that the locking member is of proper size and arranged so that it will assume the position of Fig. 1 when the nut is screwed down on the bolt and the position of Fig. 2 when the nut is rotated in the opposite direction.

For the attainment of one of the objects of this invention the locking member is so shaped and related to the other parts that when it is interposed between the nut and the bolt in operative position, its biting edge 9 extends at all times beyond the periphery of the piece which carries it; at the same time the fit of the nut upon the bolt is slightly loose, which may be due to cutting the threads of the nut a little deeper than necessary; so that there will be at all times a stress between the bolt, locking member and nut, and the nut will be slightly eccentric upon the bolt. The locking member has rolling engagement with the bottom wall of the recess 4 and is so shaped that its center of oscillation approaches the axis of the nut as the latter is rotated in one direction, and recedes therefrom as it is rotated in the other direction. The effect of thus changing the center of oscillation is obviously a locking or gripping engagement of the portion 9 of the locking member with the bolt, when the nut is rotated to remove it from the bolt, as shown in Fig. 2. Now rolling movement of the locking member 5 in one direction is limited, as by the engagement of the threaded portion of the locking member with the bolt, as affected by the shape of the rolling face of the locking member and its relation to the bottom wall of the slot. When the locking member has reached this point its center of oscillation is farthest from that of the nut, and there is the least possible stress between the locking member and the bolt, not sufficient to prevent movement of the bolt in the direction indicated in Fig. 1, but sufficient so that when the slightest tendency toward movement in the direction of Fig. 2 is manifested the reaction between the bolt and the locking member will instantly begin to roll the locking member upon the bottom wall of the recess, and any such rolling movement, even the slightest, will bring the center of oscillation of the locking member closer to that of the nut, with the result that the gripping portion 9 of the locking member bites into the bolt and the nut and bolt are locked against relative rotation in a direction to separate them. It is believed that the operation and use of the device will be clear from the foregoing description of parts and relations, and further detailed explanation thereof is accordingly omitted.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention, which as a matter of language might be said to fall therebetween.

Having thus described my invention, what I claim as new and desire to secure by Letters Patent, is:

In a device of the kind described, a bolt, a nut loosely fitting thereon, and an oscillatory locking member carried by the nut and extending inwardly beyond the line of the threads of the nut at all times to engage the bolt whereby a stress is maintained at all times between the nut, bolt, and locking member.

In witness whereof I affix my signature in the presence of two witnesses.

LEON ST. BRACH.

Witnesses:
 FRANK J. KENT,
 A. HONIGSBERG.

---

Copies of this patent may be obtained for five cents each, by addressing the "Commissioner of Patents, Washington, D. C."